United States Patent
Madan et al.

(10) Patent No.: US 8,139,533 B2
(45) Date of Patent: Mar. 20, 2012

(54) DIVISION OF THE SCHEDULING ALGORITHM INTO BACKGROUND AND FOREGROUND ALGORITHMS

(75) Inventors: Ritesh K. Madan, Jersey City, NJ (US); Arnab Das, Bethesda, MD (US); Sundeep Rangan, Jersey City, NJ (US); Siddharth Ray, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 752 days.

(21) Appl. No.: 12/261,297

(22) Filed: Oct. 30, 2008

(65) Prior Publication Data

US 2009/0116438 A1  May 7, 2009

Related U.S. Application Data

(60) Provisional application No. 60/985,530, filed on Nov. 5, 2007.

(51) Int. Cl.
*H04W 4/00* (2009.01)
(52) U.S. Cl. .................................. 370/329; 370/437
(58) Field of Classification Search .......... None
See application file for complete search history.

(56) References Cited

U.S. PATENT DOCUMENTS

| 2007/0268829 A1* | 11/2007 | Corwin et al. ............... 370/235 |
| 2008/0016008 A1* | 1/2008 | Siegel et al. ............... 705/36 R |

FOREIGN PATENT DOCUMENTS

| EP | 1703665 A1 | 9/2006 |
| WO | WO9619905 | 6/1996 |

OTHER PUBLICATIONS

International Search Report/Written Opinion—PCT/US08/082420—International Search Authority EPO—May 14, 2009.

* cited by examiner

*Primary Examiner* — Jianye Wu
(74) *Attorney, Agent, or Firm* — Donald C. Kordich

(57) ABSTRACT

Systems and methodologies are described that facilitate dividing scheduling algorithms into background and foreground aspects capable of simultaneously servicing a multiplicity of disparate flows in wideband communications networks. The systems provided herein arbitrarily select prospective time horizons, generate optimal bandwidth allocation targets based on a plurality of flows observed by the system, and utilizes the optimal bandwidth targets to assign flows to users over the entirety of the prospective time horizon.

35 Claims, 9 Drawing Sheets

DIVISION OF THE SCHEDULING ALGORITHM INTO BACKGROUND AND FOREGROUND ALGORITHMS

CROSS-REFERENCE TO RELATED APPLICATIONS

This application claims the benefit of U.S. Provisional Patent Application Ser. No. 60/985,530 entitled "DIVISION OF THE SCHEDULING ALGORITHM INTO BACKGROUND AND FOREGROUND ALGORITHMS" which was filed Nov. 5, 2007. The entirety of the aforementioned application is herein incorporated by reference.

BACKGROUND

I. Field

The following description relates generally to wireless communications, and more particularly to dividing scheduling algorithms into background and foreground aspects capable of simultaneously servicing thousands or hundreds of thousands of flows in wireless wideband or broadband communications networks.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, ...). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the NT transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

In wireless data systems, a scheduling policy should typically compute an allocation of power and bandwidth to different flows to ensure fairness between elastic flows, meet Quality of Service (QoS) constraints, and exploit multi-user diversity to name but a few. Traditionally, scheduling algorithms for wireless systems that have at least the above characteristics are geared towards giving a single flow the entire bandwidth at any given time. Such a policy typically is good for narrowband systems, where the amount of bandwidth available at each time is relatively small. However, for wideband systems, for scheduling policy to be optimal, the bandwidth at each time may need to be shared between multiple flows. In general, any policy which is suitable for scheduling a single user in a frame can be modified to the wideband case—simply by running the policy on small amounts of spectral resource (e.g., each tile in a frame in Ultra Mobile Broadband (UMB). Nevertheless, this can require a lot of computation in every frame.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with dividing scheduling algorithms into background and foreground aspects capable of contemporaneously servicing thousands or hundreds of thousands of disparate flows in wireless wideband and/or broadband communications networks. The systems and/or methodologies in accordance with an aspect of the claimed subject matter provide for an apparatus operable in a wireless wideband communication system wherein the apparatus includes a processor configured to arbitrarily select a prospective time horizon, generate an aspirational optimal target bandwidth allocation based in part on a plurality of flows observed by the apparatus, and utilize the aspirational optimal target bandwidth allocation to at least one of assign flows to users to an entirety of the flows or to allocate flows to users over the prospective time horizon, and a memory coupled to the processor for persisting data.

In accordance with a further aspect of the claimed subject matter an apparatus operable in a wireless communication system is disclosed. The apparatus includes a memory that retains instruction related to arbitrarily selecting a prospective time horizon, generating an aspirational optimal target bandwidth allocation based on a plurality of flows observed by the apparatus, and utilizing the aspirational optimal target bandwidth allocation to at least one of assign flows to users to an entirety of the flows or to allocate flows to users over the prospective time horizon, and a processor, coupled to the memory, configured to execute the instructions retained in the memory.

Additionally, in accordance with a further aspect of the claimed subject matter, a machine-readable medium having stored thereon machine-executable instructions for arbitrarily selecting a prospective time horizon, generating an aspirational optimal target bandwidth allocation based at least in part on a plurality of flows observed by an apparatus actuating the machine-executable instructions, and utilizing the aspirational optimal target bandwidth allocation to at least one of assign flows to users to an entirety of the flows or to allocate flows to users over the prospective time horizon, is disclosed.

Moreover, in accordance with yet a further aspect of the claimed subject matter, an apparatus operable in a wireless communication system is provided. The apparatus includes means for arbitrarily selecting a prospective time horizon, means for generating an aspirational optimal target bandwidth allocation based in part on a plurality of flows observed by the apparatus, and means for utilizing the aspirational optimal target bandwidth allocation to at least one of assign flows to users to an entirety of the flows or to allocate flows to users over the prospective time horizon.

Furthermore, in accordance with a further aspect of the claimed subject matter disclosure is made herein of a computer programming product, comprising a computer-readable medium that includes a first set of codes for causing the computer to arbitrarily select a prospective time horizon, a second set of codes for causing the computer to generate an aspirational optimal target bandwidth allocation based at least in part on a plurality of flows observed by the computer actuating the second set of codes, and a third set of codes for causing the computer to utilize the aspirational optimal target bandwidth allocation to at least one of assign flows to users to an entirety of the flows or to allocate flows to users over the prospective time horizon.

[Summary to be inserted upon approval of the claims]

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
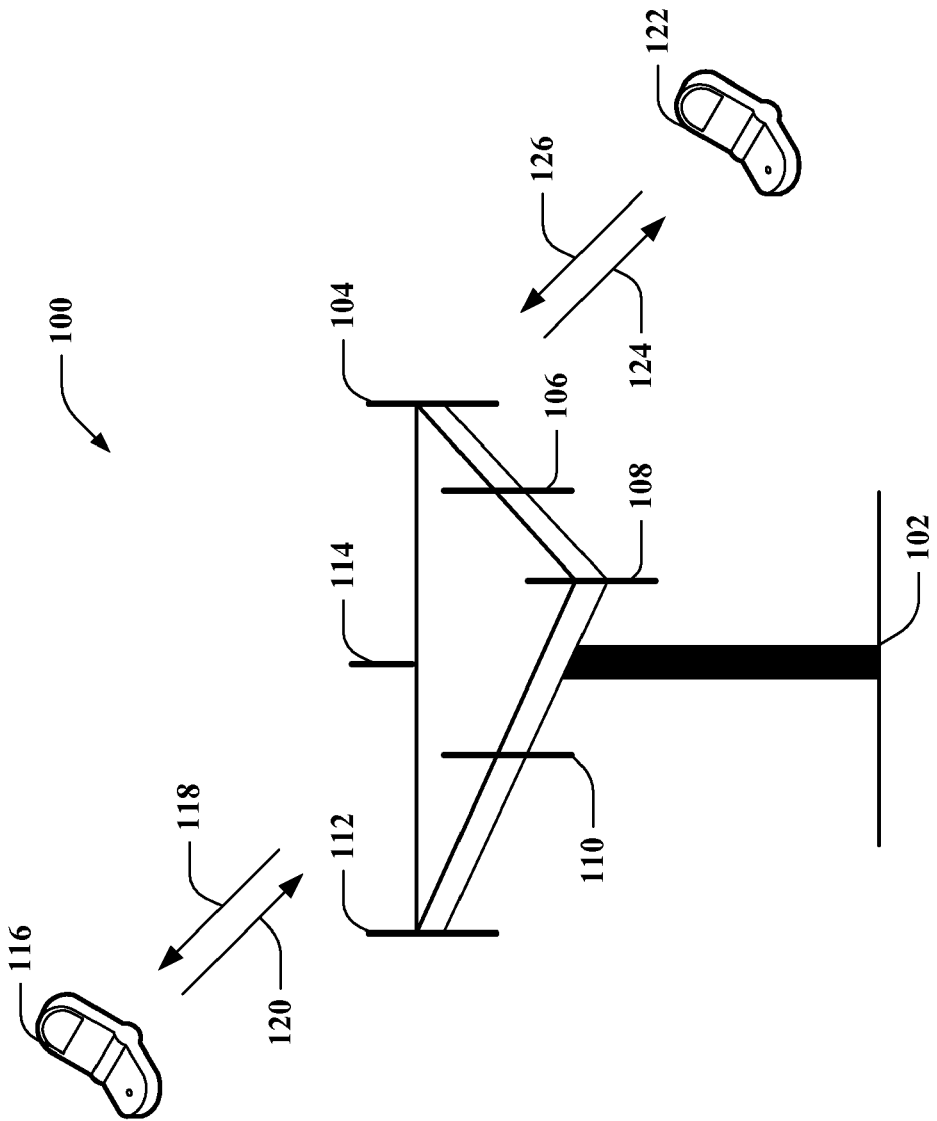
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Figure 2:
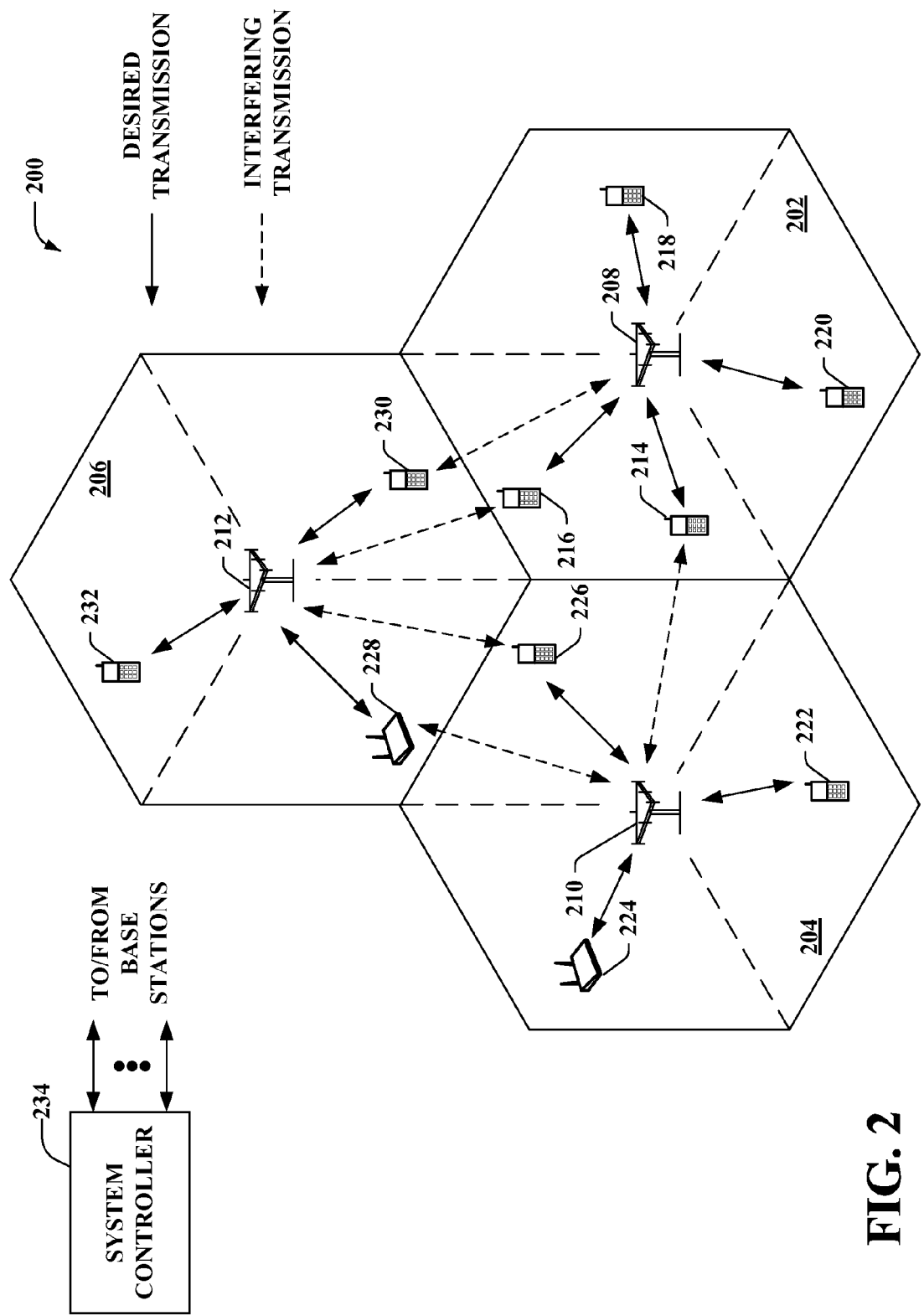
FIG. 2 is an illustration of an example multiple access wireless communication system according to various embodiments for signal transmission.

FIG. 2 illustrates a multiple access wireless communication system 200 according to various embodiments for signal transmission. Multiple access wireless communication system 200 can include multiple cells (e.g., cell 202, cell 204, and cell 206). As depicted, each cell 202-206 can include a respective base station 208, 210, 212, which can include one or more sectors. The sectors can be formed by groups of antennas, each responsible for communication with access terminals in a portion of the cell.

Each cell 202-206 can include a plurality of access terminals, which can be in communication with one or more sectors of each base station 208-212. For example, access terminals 214, 216, 218, and 220 are in communication with base station 208, access terminals 222, 224, and 226 are in communication with base station 210, and access terminals 228, 230, and 232 are in communication with base station 212.

As illustrated in cell 204, for example, each access terminal 222, 224, and 226 can be located at a different position within cell 204. For instance, each access terminal 222, 224, and 226 can be at a different distance from the corresponding antenna group with which it is communicating. These factors, along with environmental and other conditions, can cause different channel conditions to be present between each access terminal 222, 224, and 226 and its corresponding antenna group with which it is communicating. Similarly, disparate channel conditions can be experienced between other access terminals (e.g., access terminals 214-220, 228-232, . . . ) and corresponding antenna groups with which they respectively communicate.

In accordance with some aspects, access terminals in a particular cell can be in communication with the base station associated with that cell and, at substantially the same time, be interfering with another base station associated with a different cell. For example, access terminal 214 can be in communication with base station 208 and can interfere with base station 210, access terminal 216 can be in communication with base station 208 and can interfere with base station 212, access terminal 226 can be in communication with base station 210 and can interfere with base station 212, access terminal 228 can be in communication with base station 212 and can interfere with base station 210, and access terminal 230 can be in communication with base station 212 and can interfere with base station 208.

A controller 234 can be coupled to each of cells 202, 204, and 206. Controller 234 can include one or more connections to one or more networks, such as the Internet, packet-data based networks, and/or circuit-switched voice networks, which provide information to, and from, access terminals in communication with the cells of multiple access wireless communication system 200. Controller 234 can include, or is coupled to, a scheduler configured to schedule transmission from and to access terminals. In some embodiments, scheduler can reside in each individual cell, each sector of a cell, or a combination thereof.

A cell can refer to a coverage area serviced by a base station. A cell can further include one or more sectors. For simplicity and clarity, the term "sector" can be used herein to refer to a cell, or a section of a cell, serviced by a base station. The terms "access terminal" and "user" can be used interchangeably, and the terms "sector" and "base station" can also be used interchangeably. A serving base station/sector can refer to a base station/sector with which an access terminal communicates.

As shown in system 200, each sector can receive "desired" transmissions from access terminals within the sector as well as "interfering" transmissions from access terminals in other sectors. The total interference observed at each sector includes 1) intra-sector interference from access terminals within the same sector and 2) inter-sector interference from access terminals in other sectors. Intra-sector interference can be substantially eliminated using OFDMA transmission from the access terminals, which ensures orthogonality between transmissions of different access terminals in the same sector. The inter-sector interference, which is also called other sector interference (OSI), results from the transmissions in one sector not being orthogonal to the transmissions in the other sectors.

Typically resource allocation in wireless systems is done on a frame-by-frame basis. During each frame, a scheduling algorithm computes a resource allocation across flows which can be a function of the flow class (e.g., best effort or delay sensitive), the average rate that the flow has been serviced during the recent past, the number of bytes in the buffer, packet delay, and the like.

As will be appreciated by those moderately conversant in this field of endeavor, there can be disadvantages to this approach. For instance, in high data rate systems, each frame can be as small as 1 millisecond (e.g., 1 ms), of which only a small fraction can be available to compute or determine resource allocation. In such situations the resource allocation policy can be limited to only computationally lightweight policies. A further disadvantage is that a user's assignments can be split over multiple frames. For example, a user may require a certain amount of bandwidth in a current frame, and additional bandwidth after 3 ms. Making an assignment generally costs power and/or spectrum. For a channel that can be tracked, the channel state typically does not vary much over such a short time. Hence, ideally it would be preferable to combine the two assignments into one assignment over a single frame.

In order to overcome these problems, a scheduling algorithm can be divided into two aspects: a background aspect and a foreground aspect. The background aspect can effectuate an online algorithm that determines an optimal resource allocation for users—the optimization is typically performed over a few frames simultaneously. Moreover, in accordance with this background aspect an iterative technique is employed wherein at each iteration a valid resource allocation is provided. The foreground aspect can then allocate available resources to users according to the optimal resource allocation ascertained by the background aspect. For example, if a given user should be allocated 10 blocks of resources over a period of 10 frames and if 4 blocks become available in one frame, the 4 available blocks can be allocated to the user at issue. The remaining 6 blocks can then be allocated over 9 subsequent frames.

It should be noted without limitation or loss of generality at this juncture, that the claimed subject matter employs the terms "users" and "flows" interchangeably, and that in general, a user can have or be associated with multiple flows; but for convenience of exposition, the claimed subject matter is explicated, for the most part, in terms of instances where a user has or is associated with one flow. Accordingly, if one considers a wireless cellular network that has to distribute bandwidth and power across n users and if it is assumed that the available transmit power is distributed uniformly across the entire bandwidth (e.g., distribution of power is not optimized across the bandwidth) such a situation is typically suboptimal, but nevertheless, adoption of such a strategy can reduce computational complexity significantly. Moreover, for systems like Ultra Mobile Broadband (UMB) with hybrid automatic repeat request (HARQ) transmissions, the issue of determining optimal transmit powers can be an intractable one. The claimed matter in accordance with one or more aspects overcomes the foregoing short comings by distributing the total bandwidth across different flows.

In the near future wideband wireless systems and architectures are predicted to be very wideband with thousands of flows which will need to support huge 20 MHz and higher bandwidths. In order to support such large bandwidths there will be a need to granulize wireless bandwidths. For example, there can be a need, in one instant in time, to assign a user the 180 KHz band from a 20 MHz bandwidth for 1 ms and in subsequent instances of time (e.g., in the next 1 ms) assign the 180 KHz sub-band to disparate other users. As will be appreciated by those reasonably cognizant in this field of endeavor, this can be an extremely complex scheduling problem because of the high granularity. Moreover, there can be thousands of different/disparate flows, different requirements, data rates, polarities, etc., requiring the scheduler to run every 1 ms; a monumental task that needs be accomplished effectively in less than 1 ms. Attempting to determine what needs to be done in less than 1 ms—which user needs to be assigned, what power level needs to be assigned, what bandwidth to allocate from the available flows, how many packets should be distributed with these different flows, to which user, etc.—can be extremely difficult. Additionally, to compound matters, the 1 ms window can further include other activities such as encoding packets and transmitting these packets, and the like.

Figure 3:
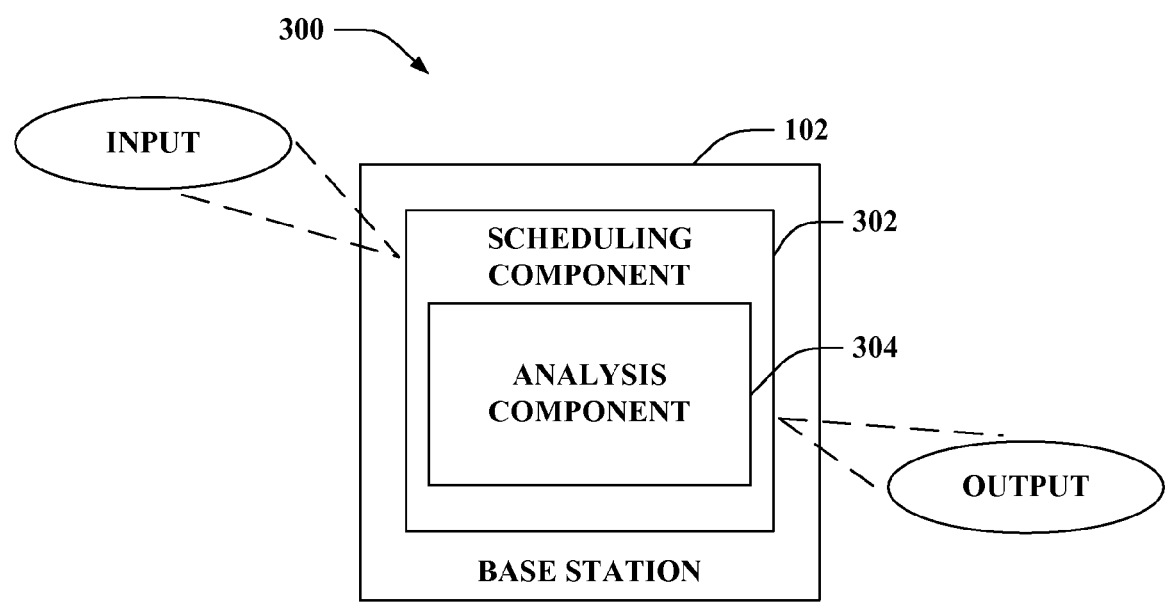
FIG. 3 is an illustration of an example system that divides and employs background and foreground aspects of a scheduling process to coevally service multiple disparate flows in a wireless communication environment.

Turning now to FIG. 3 that more particularly depicts 300 an illustrative base station 102 that includes scheduling component 302 and associated analysis component 304. As illustrated, base station 102 utilizes the facilities of scheduling component 302 that in concert with analysis component 304 optimizes bandwidth scheduling over thousands of flows, efficiently allocating appropriate resources (e.g., bandwidths and/or sub-bands), and simultaneously supporting a large number of users.

In accordance with aspects of the claimed subject matter, scheduling component 302, through utilization of analysis component 304, looks ahead over a brief, but arbitrarily selected, time horizon (e.g., for the sake of discussion and exposition, assume that the time horizon is 10 ms) and determines how to optimally allocate bandwidth over the prospective time horizon, based at least in part on the number of flows, the number of users associated with base station 102, or a grouping of users employing base station 102, and the like. Further, scheduling component 302, once again through the facilities of analysis component 304, can identify users or groups of users, allocate appropriate bandwidths to identified users or groups of users (e.g., allocate specific sub-bands within a particular band to designated users for a particular time horizon), and assign resources over the upcoming time horizon to the identified users or groups of users. It should be noted without limitation or loss of generality that the upcoming time horizon at this stage can be a sub-interval of the prospective time horizon identified earlier). In this manner, resources and users can be optimally apportioned or distributed over available bandwidths, thereby enhancing the overall just-in-time nature of scheduling component 302 and further ensuring that scheduling component 302 is capable of undertaking theoretically more complex scheduling tasks than was previously the case.

Figure 4:
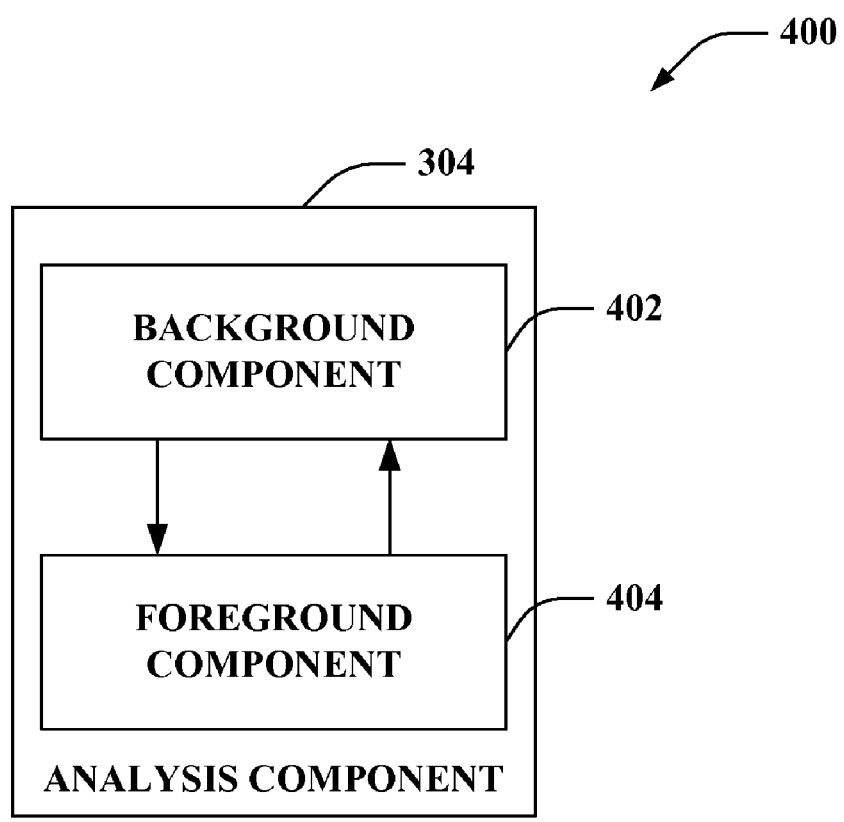
FIG. 4 is a further illustration of an example system that divides and employs background and foreground aspects of a scheduling process to contemporarily service multiple disparate flows in accordance with various aspects of the subject disclosure.

FIG. 4 provides a more detailed depiction 400 of analysis component 304 in accordance with aspects of the claimed subject matter. As illustrated, analysis component 304 can include background component 402 and foreground component 404 that together optimize bandwidth scheduling over thousands of flows and in so doing efficiently allocates resources and supports large numbers of users. Background component 402 can look ahead over a selected time horizon and determine how to allocate bandwidth, based at least in part on the number of current flows, the number of users currently associated with base station 102 (or base stations 208-212), channel quality indications (e.g., strength of signal from base stations to access terminals, viz., strength of signal from base stations 102, 208, 210, and 212 to access terminals 116, 122, 214, 218, 220, 222, 224, 226, 228, 230, and 232), the number of bytes in each of the queues associated with the access terminals (e.g., any and all of access terminals 116, 122, 214, 218, 220, 222, 224, 226, 228, 230, and 232)— typically these queues are situated on the base station (e.g., base stations 102, 208, 210, and 212) so the base station is aware of the number of bytes in each queue associated with each access terminal being serviced by the base station, head of line delay of the packets (or more particularly, the arrival time of the packets on each queue associated with each access terminal serviced by a particular base station), etc., in the selected prospective time horizon. Background component 402 as a consequence of its determination produces an aspirational target bandwidth allocation that can be conveyed to foreground component 404. In order to fulfill its mandate of supplying accurate, relevant, and timely bandwidth targets to foreground component 404, background component 402 can operate, for example, every few milliseconds.

Foreground component 404, since much, if not all, of the computational strain has been taken up by background component 402, can be left with tasks such as selecting or identifying users or groups of users, allocating bandwidths to selected or identified users or groups of users (e.g., allocate specific sub-bands within a particular band to designated users for a selected time horizon), assigning spectral resources over the upcoming time horizon, etc. Foreground component 404 thus employs the aspirational targets supplied by background component 402, together with information related to resources allocated to each flow since the last time that background component 402 forwarded its target recommendation, priorities of respective flows, the marginal utilities of respective flows, channel conditions for all users serviced by a particular base station, and the resources that have become unallocated at the beginning of a given frame, to optimally assign, apportion or distribute resources and/or users over available bandwidths.

It should be noted without limitation or loss of generality, that foreground component 404 attempts to satisfy the aspirational targets set forth by background component 402, but there can be occasions where foreground component 404 is unable to attain these aspirational targets, in which case more a expedient partially suboptimal allocation or distribution of resources can be facilitated by foreground component 404 (e.g., an allocation or distribution that closely approximates the aspiration target, but nonetheless in some manner falls somewhat short of the target). There can be various reasons as to why foreground component 404 is unable to satisfy the aspirational targets set forth by background component 402, such as previous transmissions failing requiring re-transmission. Where foreground component 404 fails meet the aspirational targets, it can maintain or persist to storage media associated with the base station a continuous record of these various factors that can be conveyed to background component 402 for analysis and to subsequently adjust the optimization criteria or allocation mix.

Nevertheless, once foreground component 404 has made its assignments and allocations as appropriate in order to attain the aspirational targets fed forward by background component 402, foreground component 404 can feedback information to background component 402 indicating bandwidths and/or resources that were assigned to particular users or groups of users at the instant in time in which foreground component 404 was operating. More succinctly, background component 402 supplies foreground component 404 with prospective input (e.g., aspirational bandwidth targets) whereas foreground component 404 provides retroactive but entelechial inputs (e.g., bandwidth and/or resource allocations, etc., that actually occurred in the recent past) to background component 402. Background component 402 can thereafter employ the feedback garnered from foreground component 404 in determining further aspirational targets to be fed forward to, and utilized by, foreground component 404.

Foreground component 404 (in conjunction with information supplied or fed forward by background component 402) can effectuate and/or facilitate the simultaneous or contemporaneous allocation of resources for best effort (elastic) flows, inelastic flows, delay quality of service (QoS) flows, constant rate flows, delay constraint flows, mixed flows that include best effort flows and quality of service (QoS) flows, and voice over Internet Protocol (VoIP) flows, to name but a few. For best effort flows, for instance, foreground component 404 can keep track of the average rate of flow, total bandwidth, and the like, and can attempt to assign bandwidths to users or groups of users accordingly. For quality of service (QoS) flows, for example, foreground component 404 can keep track of metrics such as head of line delays, queue lengths, etc., and based on these maintained metrics can strive to meet the targets produced by background component 402.

Once, foreground component 404 has made its respective allocation of bandwidths in furtherance of the targets promulgated by background component 402, foreground component 404 can forward the actual bandwidth usage (e.g., the bandwidths that were employed in its attempt to satisfy the targets supplied) to background component 402, whereupon background component 402, through utilization of the feedback from foreground component 404, can provide refined aspirational but more optimal targets that can be employed by foreground component 404 in its task of appropriately allocating resources to respective users or groups of users associated with base station 102.

From the foregoing it will be observed that background component 402 and foreground component 404 work in symbiotic concert to reduce the complexity of the scheduling, thereby effectively enhancing the overall just-in-time nature of the scheduler (e.g., scheduling component 302) and ensuring that the scheduler is capable of undertaking much more theoretically complex scheduling tasks. It nevertheless should be observed, without limitation, that the processes on background component 402 are typically are not actuated in a just-in-time manner, but background component 402 is nevertheless capable of supplying prospective information to foreground component 404 in order for foreground component 404 to sustain its just-in-time facility. Further, it should also be noted that the scheduling aspects of the claimed subject matter are effectively performed by foreground component 404; background component 402 typically only provides optimized aspirational targets that foreground component 404 utilizes to effectuate the scheduling and/or allocation of resources.

Figure 5:
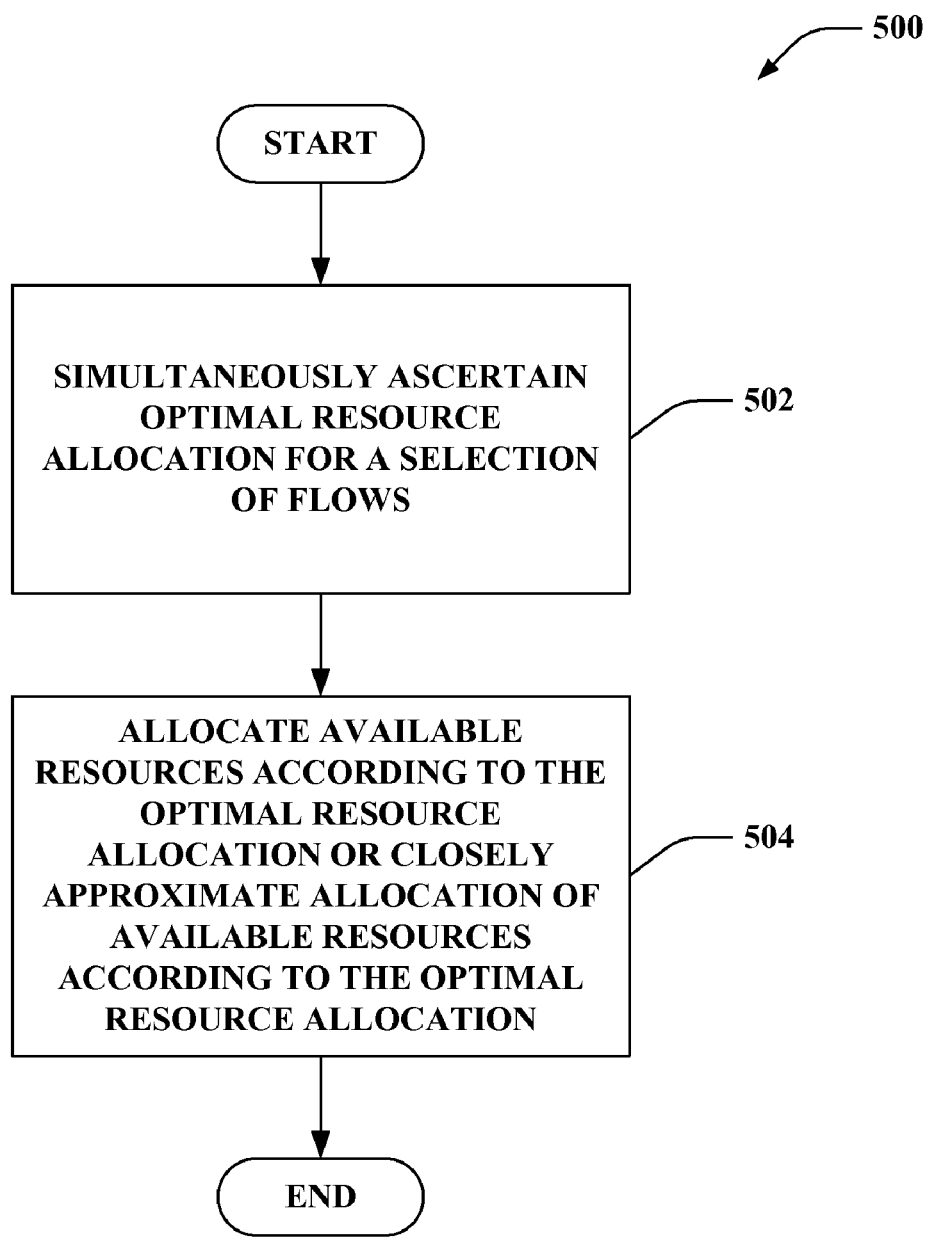
FIG. 5 is an illustration of an example methodology that facilitates splitting and utilizing background and foreground aspects of a scheduling process to synchronously service multiple disparate flows in a wireless communication environment.
Figure 6:
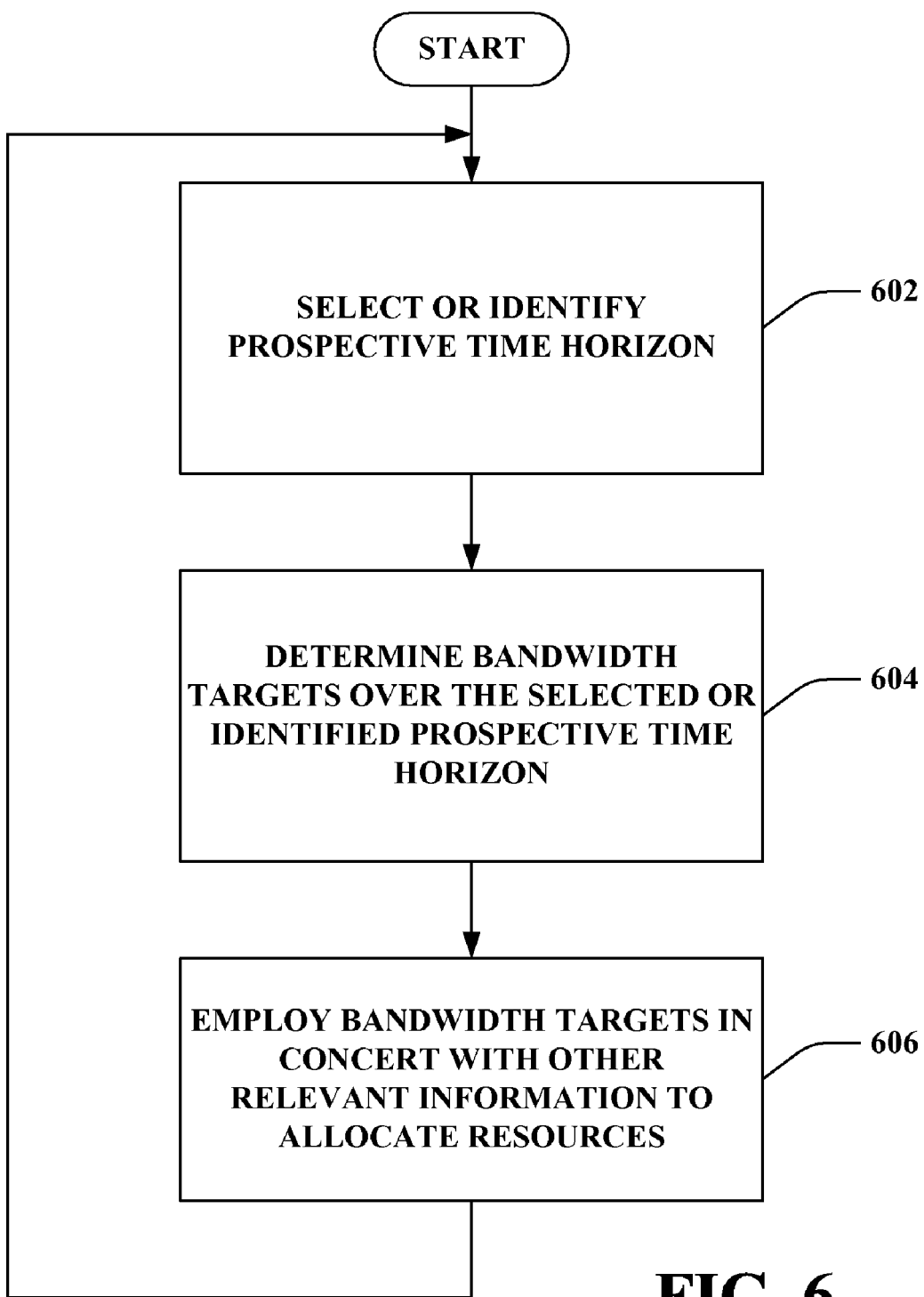
FIG. 6 is a further illustration of an example methodology that facilitates dividing and utilizing background and foreground aspects of a scheduling process to concurrently service multiple disparate flows in a wireless communication environment.

Referring to FIGS. 5-6, methodologies relating to dividing and utilizing background and foreground aspects to service multiple flows in a wideband wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 5, illustrated is a methodology 500 that effectuates and/or facilitates dividing a scheduling process actuated in a wideband communications infrastructure into background and foreground aspects in order to simultaneously service multiple flows. Method 500 can commence at 502 wherein a background aspect of the scheduling process can simultaneously ascertain an optimal resource allocation for a wide variety of selected flows. In this context an optimal resource allocation can be achieved over a few prospective frames simultaneously by utilizing an iterative technique wherein at the conclusion of each iteration of the iterative technique a valid resource allocation is generated. At 504 the optimal resource allocation ascertained by the background aspect of the scheduling process can be employed by a foreground aspect of the scheduling process to allocate available resources or freed up resources to flows or users.

With reference to FIG. 6, illustrated is a further methodology 600 that effectuates and/or facilitates dividing a scheduling process actuated in a wideband communications infrastructure into background and foreground aspects in order to simultaneously service multiple flows. Method 600 can commence at 602 where a prospective time horizon (e.g., 2 ms, 5 ms, 7 ms, 10 ms, 13 ms, etc.) can be ascertained. At 604 a background aspect of the scheduling process can determine appropriate and optimized bandwidth targets. At 604 the background aspect can utilize the prospective time horizon to determine how best to allocate bandwidth. The optimization of bandwidth targets can be based on a number of factors including, channel quality indications (e.g., strength of channel between base station and access terminals), the number of bytes in each queue associated with individual access terminals, the head of queue delay of packets, respective queue lengths associated with individual access terminals, etc. The background aspect at 604 can employ the foregoing information, together with periodic updates that it receives from the foreground aspects of the scheduling process to update respective queues, the average rates of flow, and the head of line delay, for example. Additionally, the background aspect at 604 can employ information on arrivals and/or departures of access terminals to or from the ambit or coverage extent of the base station. Information regarding arrivals and/or departures of access terminals within the coverage area of a base station can be gleaned from media access control (MAC) information associated with access terminals. Such information provides indication to the background aspect that additional resources will be required to successfully service these units. Thus, at 604 the background aspect of the scheduling process can utilize these inputs to determine optimal bandwidth targets to be employed over the prospective time horizon.

At 606 a foreground aspect of the scheduling process can employ the optimal bandwidth targets determined at 604 together with other relevant information to allocate resources to disparate and multiple users or flows. At 606 the foreground aspect can retrieve, acquire, solicit, derive, or ascertain information such as channel quality indications, respective queue lengths, head of line delays, priority and/or marginal utility of respective flows, data with regard to scheduled transmissions that occurred a few milliseconds before, whether or not the scheduled transmissions were successful, and the like. In this manner at 606 the foreground aspect of the scheduling process can be continuously appraised as to whether or not transmissions succeeded and can on a millisecond basis determine what resources should be assigned for a given flow, what coding and modulation schemes should be employed, etc. Once processing has completed at 606 the methodology can cycle back to 602 where feedback generated by the foreground aspect can be utilized to refine and or re-calibrate the target resource allocations generated by the background aspect of the scheduling process over the next selected or identified prospective time horizon.

It will be appreciated that, in accordance with one or more aspects described herein, inferences can be made regarding dividing and employing background and foreground aspects of a scheduling process to effectively and efficiently service multiple disparate flows in a wideband communications network. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or methods presented above can include making inferences pertaining to dividing and employing background and foreground aspects of a scheduling process to effectively and efficiently service multiple disparate flows in a wideband communications network. It will be appreciated that the foregoing example is illustrative in nature and is not intended to limit the number of inferences that can be made or the manner in which such inferences are made in conjunction with the various embodiments and/or methods described herein.

Figure 7:
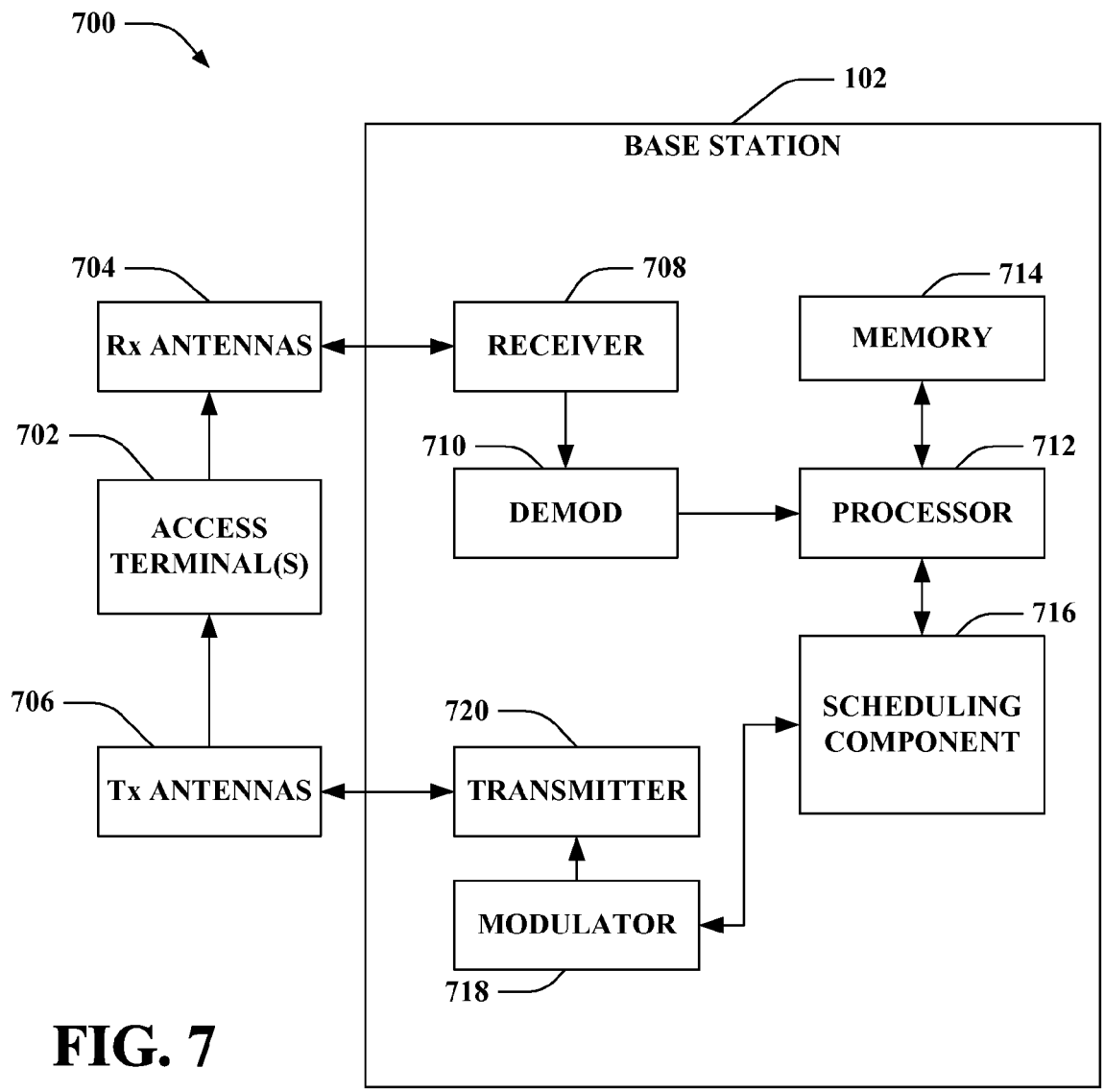
FIG. 7 is an illustration of an example system that facilitates splitting and utilizing background and foreground aspects of a scheduling process to isochronously service multiple disparate flows in a wireless wideband and/or broadband communication environment.

FIG. 7 is an illustration of a system 700 that facilitates dividing and employing background and foreground aspects of a scheduling process to effectively and efficiently service multiple disparate flows in a wideband wireless communications network. System 700 comprises a base station 102 (e.g., access point, . . . ) with a receiver 708 that receives signal(s) from one or more access terminals 702 through a plurality of receive antennas 704, and a transmitter 720 that transmits to the one or more access terminals 702 through a transmit antenna 706. Receiver 708 can receive information from receive antennas 704 and is operatively associated with a demodulator 710 that demodulates received information. Demodulated symbols are analyzed by a processor 712 that can be a processor dedicated to analyzing information received by receiver 708 and/or generating information for transmission by a transmitter 720, a processor that controls one or more components of base station 102, and/or a processor that both analyzes information received by receiver 708, generates information for transmission by transmitter 720, and controls one or more components of base station 102, and which is coupled to a memory 714 that stores data to be transmitted to or received from access terminal(s) 702 (or a disparate base station (not shown)) and/or any other suitable information related to performing the various actions and functions set forth herein. Processor 712 is further coupled to a scheduling component 716 that implements dividing and employing background and foreground aspects of a scheduling process to effectively and efficiently service multiple disparate flows in a wideband wireless communications network. Modulator 718 can multiplex a frame for transmission by a transmitter 720 through antennas 706 to access terminal (s) 702. Although depicted as being separate from the processor 712, it is to be appreciated that scheduling component 716 can be part of processor 712 or a number of processors (not shown).

It will be appreciated that the data store (e.g., memory 714) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The memory 714 of the subject systems and methods is intended to comprise, without being limited to, these and any other suitable types of memory.

Figure 8:
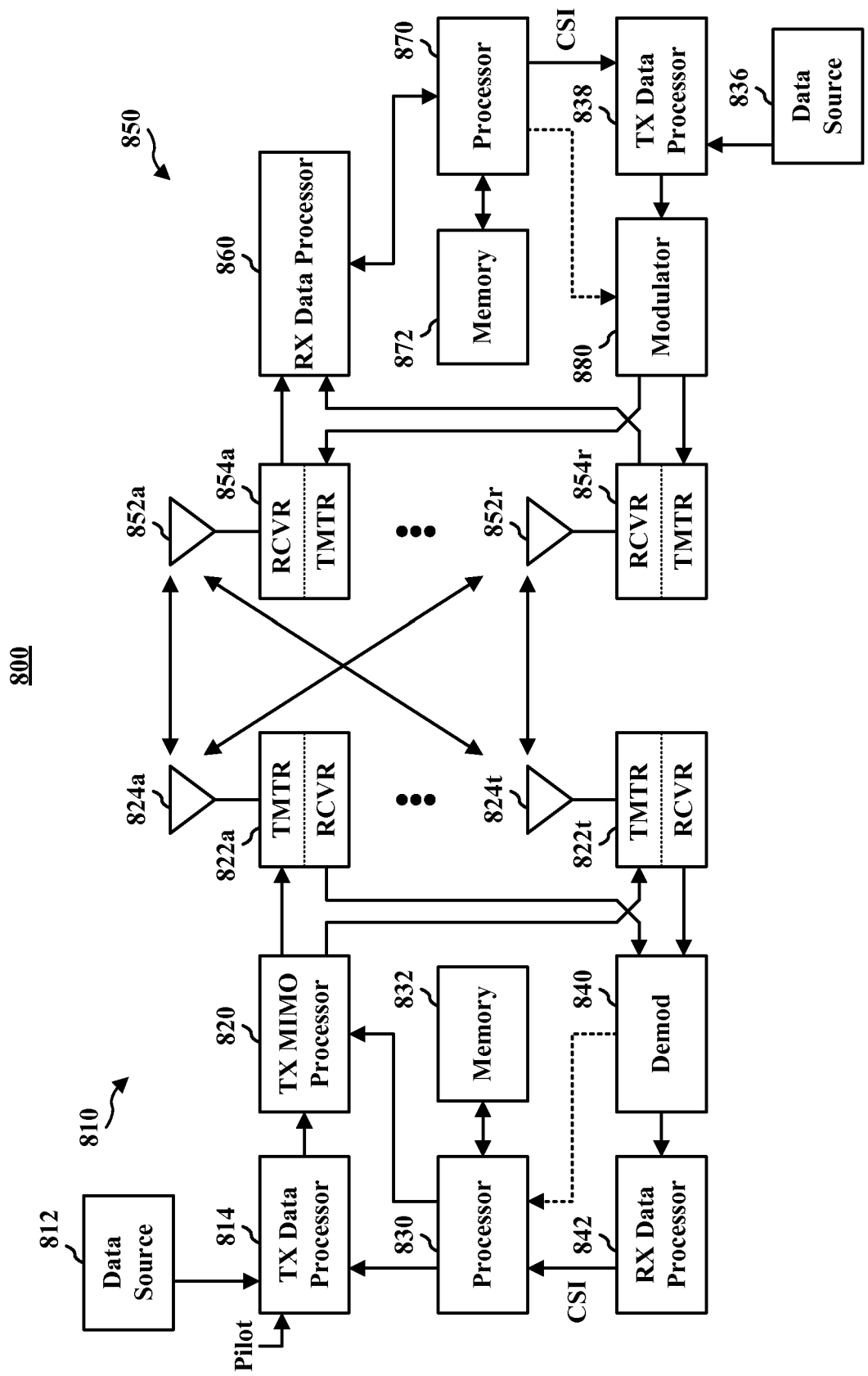
FIG. 8 is an illustration of an example wireless network environment that can be employed in conjunction with the various systems and methods described herein.

FIG. 8 shows an example wireless communication system 800. The wireless communication system 800 depicts one base station 810 and one access terminal 850 for sake of brevity. However, it is to be appreciated that system 800 can include more than one base station and/or more than one access terminal, wherein additional base stations and/or access terminals can be substantially similar or different from example base station 810 and access terminal 850 described below. In addition, it is to be appreciated that base station 810 and/or access terminal 850 can employ the systems (FIGS. 1-4) and/or methods (FIGS. 5-6) described herein to facilitate wireless communication there between.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At access terminal 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

A processor 870 can periodically determine which available technology to utilize as discussed above. Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from access terminal 850 are received by antennas 824, conditioned by receivers 822, demodulated by a demodulator 840, and processed by a RX data processor 842 to extract the reverse link message transmitted by access terminal 850. Further, processor 830 can process the extracted message to determine which preceding matrix to use for determining the beamforming weights.

Processors 830 and 870 can direct (e.g., control, coordinate, manage, etc.) operation at base station 810 and access terminal 850, respectively. Respective processors 830 and 870 can be associated with memory 832 and 872 that store program codes and data. Processors 830 and 870 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, ... ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
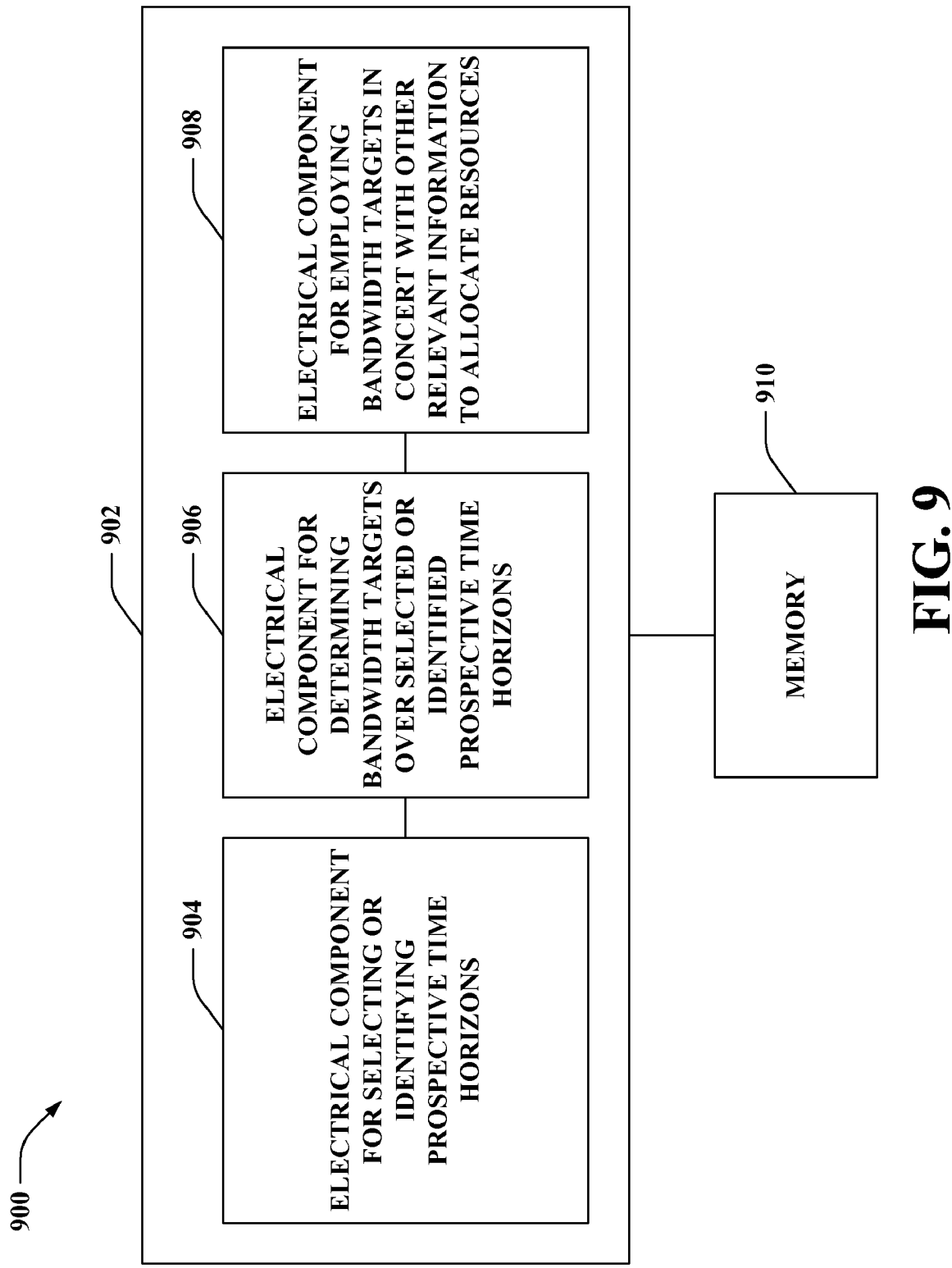
FIG. 9 is an illustration of an example system that enables dividing and employing background and foreground aspects of a scheduling process to service multiple disparate flows in a wireless communication environment.

With reference to FIG. 9, illustrated is a system 900 that enables dividing and employing background and foreground aspects of a scheduling process to optimally and efficiently service multiple disparate flows in a wireless communication environment. For example, system 900 can reside at least partially within a base station. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for selecting or identifying prospective time horizons 904. Further, logical grouping 902 can include an electrical component for determining bandwidth targets over selected or identified prospective time horizons 906. Moreover, logical grouping 902 can comprise an electrical component for employing bandwidth targets in concert with other information to allocate resources 908. Additionally, system 900 can include a memory 910 that retains instructions for executing functions associated with electrical components 904, 906, and 908. While shown as being external to memory 910, it is to be understood that one or more of electrical components 904, 906, and 908 can exist within memory 910.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus operable in a wireless wideband communication system, the apparatus comprising:
    a processor configured for arbitrarily selecting a prospective time horizon, generating an aspirational optimal target bandwidth allocation based at least in part on a plurality of flows observed by the apparatus and a channel quality indicator that indicates a signal strength from the apparatus to an access device associated with a user, and utilizing the aspirational optimal target bandwidth allocation to allocate flows to users over the prospective time horizon; and
    a memory coupled to the processor for persisting data.

2. The apparatus of claim 1, wherein the arbitrarily selecting the prospective time horizon and the generating of the aspirational optimal target bandwidth allocation are actuated on an as needed basis.

3. The apparatus of claim 2, wherein the as needed basis is triggered by effluxion of the prospective time horizon.

4. The apparatus of claim 1, wherein the utilizing of the aspirational optimal target bandwidth allocation to allocate flows to users over the prospective time horizon is effectuated in a just in time manner.

5. The apparatus of claim 1, wherein the generating of the aspirational optimal target bandwidth allocation is based at least in part on one or more of a number of current flows, a number of users associated with the apparatus, a number of bytes extant in a queue associated with the access device, or a head of line delay associated with a packet situated at a head of the queue associated with the access device.

6. The apparatus of claim 1, the utilizing the aspirational optimal target bandwidth allocation to allocate flows to users over the prospective time horizon further comprising at least one of selecting users or groups of users, allocating bandwidths to selected users or groups of users, assigning spectral resources over the prospective time horizon as the prospective time horizon unfolds, or employing one or more distinct utility function associated with each of the flows.

7. The apparatus of claim 1, wherein the utilizing the aspirational optimal target bandwidth allocation to allocate flows to users over the prospective time horizon provides feedback to the generating an aspirational optimal target bandwidth allocation based at least in part on a plurality of flows observed by the apparatus when the utilizing the aspirational optimal target bandwidth allocation to allocate flows to users over the prospective time horizon is unable to satisfy the aspirational optimal target bandwidth allocation.

8. An apparatus operable in a wireless communication system, the apparatus comprising:
    a memory that retains instruction related to arbitrarily selecting a prospective time horizon, generating an aspirational optimal target bandwidth allocation based at least in part on a plurality of flows observed by the apparatus and a channel quality indicator that indicates a signal strength from the apparatus to an access device associated with a user, and utilizing the aspirational optimal target bandwidth allocation to allocate flows to users over the prospective time horizon; and
    a processor, coupled to the memory, configured to execute the instructions retained in the memory.

9. The apparatus of claim 8, wherein the arbitrarily selecting the prospective time horizon and the generating of the aspirational optimal target bandwidth allocation are actuated on an as needed basis.

10. The apparatus of claim 9, wherein the as needed basis is triggered by effluxion of the prospective time horizon.

11. The apparatus of claim 8, wherein the utilizing of the aspirational optimal target bandwidth allocation to allocate flows to users over the prospective time horizon is effectuated in a just in time manner.

12. The apparatus of claim 8, wherein the generating of the aspirational optimal target bandwidth allocation is based at least in part on one or more of a number of current flows, a number of users associated with the apparatus, a number of bytes extant in a queue associated with the access device, or a head of line delay associated with a packet situated at a head of the queue associated with the access device.

13. The apparatus of claim 8, the utilizing the aspirational optimal target bandwidth allocation to allocate flows to users over the prospective time horizon further comprising at least one of selecting users or groups of users, allocating bandwidths to selected users or groups of users, assigning spectral resources over the prospective time horizon as the prospective time horizon unfolds, or employing one or more distinct utility function associated with each of the flows.

14. The apparatus of claim 8, wherein the utilizing the aspirational optimal target bandwidth allocation to allocate flows to users over the prospective time horizon provides feedback to the generating an aspirational optimal target bandwidth allocation based at least in part on a plurality of flows observed by the apparatus when the utilizing the aspirational optimal target bandwidth allocation to users over the prospective time horizon is unable to satisfy the aspirational optimal target bandwidth allocation.

15. A non-transitory machine-readable medium having stored thereon machine-executable instructions for:
    arbitrarily selecting a prospective time horizon;
    generating an aspirational optimal target bandwidth allocation based at least in part on a plurality of flows observed by an apparatus actuating the machine-executable instructions and a channel quality indicator that indicates a signal strength from the apparatus to an access device associated with a user; and
    utilizing the aspirational optimal target bandwidth allocation to allocate flows to users over the prospective time horizon.

16. The non-transitory machine-readable medium of claim 15, wherein the arbitrarily selecting the prospective time horizon and the generating of the aspirational optimal target bandwidth allocation are actuated on an as needed basis.

17. The non-transitory machine-readable medium of claim 16, wherein the as needed basis is triggered by effluxion of the prospective time horizon.

18. The non-transitory machine-readable medium of claim 15, wherein the utilizing of the aspirational optimal target bandwidth allocation to allocate flows to users over the prospective time horizon is effectuated in a just in time manner.

19. The non-transitory machine-readable medium of claim 15, wherein the generating of the aspirational optimal target bandwidth allocation is based at least in part on one or more of a number of current flows, a number of users associated with the apparatus, a number of bytes extant in a queue associated with the access device, or a head of line delay associated with a packet situated at a head of the queue associated with the access device.

20. The non-transitory machine-readable medium of claim 15, the utilizing the aspirational optimal target bandwidth allocation to allocate flows to users over the prospective time horizon further comprising at least one of selecting users or groups of users, allocating bandwidths to selected users or groups of users, assigning spectral resources over the prospective time horizon as the prospective time horizon unfolds, or employing one or more distinct utility function associated with each of the flows.

21. The non-transitory machine-readable medium of claim 15, wherein the utilizing the aspirational optimal target bandwidth allocation to allocate flows to users over the prospective time horizon provides feedback to the generating an aspirational optimal target bandwidth allocation based at least in part on a plurality of flows observed by the apparatus when the utilizing the aspirational optimal target bandwidth allocation to allocate flows to users over the prospective time horizon is unable to satisfy the aspirational optimal target bandwidth allocation.

22. An apparatus operable in a wireless communication system, the apparatus comprising:
    means for arbitrarily selecting a prospective time horizon;
    means for generating an aspirational optimal target bandwidth allocation based at least in part on a plurality of flows observed by the apparatus and a channel quality indicator that indicates a signal strength from the apparatus to an access device associated with a user; and
    means for utilizing the aspirational optimal target bandwidth allocation to allocate flows to users over the prospective time horizon.

23. The apparatus of claim 22, wherein the means for arbitrarily selecting the prospective time horizon and the generating of the aspirational optimal target bandwidth allocation are actuated on an as needed basis.

24. The apparatus of claim 23, wherein the as needed basis is triggered by effluxion of the prospective time horizon.

25. The apparatus of claim 22, wherein the means for utilizing of the aspirational optimal target bandwidth allocation to allocate flows to users over the prospective time horizon is effectuated in a just in time manner.

26. The apparatus of claim 22, wherein the means for generating of the aspirational optimal target bandwidth allocation is based at least in part on one or more of a number of current flows, a number of users associated with the apparatus, a number of bytes extant in a queue associated with the access device, or a head of line delay associated with a packet situated at a head of the queue associated with the access device.

27. The apparatus of claim 22, the means for utilizing the aspirational optimal target bandwidth allocation to allocate flows to users over the prospective time horizon further comprising at least one of means for selecting users or groups of users, means for allocating bandwidths to selected users or groups of users, means for assigning spectral resources over the prospective time horizon as the prospective time horizon unfolds, or means for employing one or more distinct utility function associated with each of the flows.

28. The apparatus of claim 22, wherein the means for utilizing the aspirational optimal target bandwidth allocation to allocate flows to users over the prospective time horizon provides feedback to the means for generating an aspirational optimal target bandwidth allocation based at least in part on a plurality of flows observed by the apparatus when the means for utilizing the aspirational optimal target bandwidth allocation to allocate flows to users over the prospective time horizon is unable to satisfy the aspirational optimal target bandwidth allocation.

29. A computer programming product, comprising:
    a non-transitory computer-readable medium comprising:
    a first set of code for causing the computer to arbitrarily select a prospective time horizon;
    a second set of code for causing the computer to generate an aspirational optimal target bandwidth allocation based at least in part on a plurality of flows observed by the computer actuating the second set of codes and a channel quality indicator that indicates a signal strength from the computer to an access device associated with a user; and
    a third set of code for causing the computer to utilize the aspirational optimal target bandwidth allocation to allocate flows to users over the prospective time horizon.

30. The computer programming product of claim 29, wherein the first set of code and the second set of code are actuated on an as needed basis.

31. The computer programming product of claim 30, wherein the as needed basis is triggered by effluxion of the prospective time horizon.

32. The computer programming product of claim 29, wherein the third set of code is effectuated in a just in time manner.

33. The computer programming product of claim 29, wherein actuation of the second set of code is based at least in part on one or more of a number of current flows, a number of users associated with the apparatus, a number of bytes extant in a queue associated with the access device, or a head of line delay associated with a packet situated at a head of the queue associated with the access device.

34. The computer programming product of claim 29, the third set of code causing the computer to at least one of select users or groups of users, allocate bandwidths to selected users or groups of users, assign spectral resources over the prospective time horizon as the prospective time horizon unfolds, or employ one or more distinct utility function associated with each of the flows.

35. The computer programming product of claim 29, the third set of code causing the computer to provide feedback to the first set of code when at completion of the third set of code the aspirational optimal target bandwidth allocation is unmet.

* * * * *